April 24, 1962     C. A. SOMVILLE     3,031,049
FASTENING DEVICE FOR METAL CONSTRUCTIONS
Filed Dec. 9, 1958

INVENTOR
CHARLES A. SOMVILLE

BY *Richards & Geier*

ATTORNEYS

United States Patent Office 3,031,049
Patented Apr. 24, 1962

3,031,049
FASTENING DEVICE FOR METAL CONSTRUCTIONS
Charles A. Somville, Burcht, Belgium, assignor to "A.V.R.," Achat, Ventes, Representations, Societe Anonyme, Brussels, Belgium
Filed Dec. 9, 1958, Ser. No. 779,216
Claims priority, application Belgium Mar. 31, 1958
3 Claims. (Cl. 189—78)

This invention relates to a new device used in metal constructions, either for fastening together the elements thereof, or for fastening separate parts or accessories onto aforesaid metal constructions, and in the most general way, for fastening one element to another. For simplifying the following description, the latter has been based by mere way of example and without implying any limitations, on the fastening of glass pane fillets in metal frameworks.

Several devices are known of course for fastening glass pane fillets to metal frames in a removable way, such devices making use of elastic parts or elements which, after deformation, engage the shaped parts of the fillet in order to hook the latter and to connect it rigidly to the frame. For removing the fillet, all that has to be done is to give it a fairly strong pull.

In a general way, the means which have been proposed and applied are either comparatively weak, or of a very special design. In other cases, difficulties arise when fastening them properly onto the frame. Moreover, some of these devices become, at least in part, less efficient after having been in service for some time, or on account of vibration or other stresses to which the frames often happen to be subjected.

The present invention concerns a new device, which is comparatively compact and strong, does not comprise any weak part and, in this particular application, is able to secure a systematic and hazard-free fastening of the glass pane fillets.

The constituent parts of this device can moreover be produced industrially by easy, fast and comparatively very economical means, and the way of applying them is quite elementary. Apart from this, on account of their very design and make, these elements can be fitted and located with almost mathematical accuracy.

Finally, a further advantage resulting from the design and the shape of aforesaid elements is that they lend themselves equally well to the fastening of fillets for single and for double panes.

Substantially, the device according to the invention is characterized by the application of rigid studs fastened to the frame and comprising a head shaped to fit the fillets and the grasping means of the latter. In one preferred embodiment of the invention, the studs are of cylindro-conical shape and provided with a fixing shank; between the cylindrical and the conical part, a means is provided for engaging the grasping means of the fillets. These means may consist either of at least one circular groove or of at least one circular rib according to whether the fillets have either at least one rib or at least one groove running alongside their inner lateral faces.

The outside diameter of the cylindrical part of the studs shall be very nearly equal or rather slightly smaller than the distance between the inner faces of the fillet side walls. The fixing shank of aforesaid rigid studs shall preferably be longer than the thickness of the metal into which it is to be fastened.

The way in which the holes are arranged on the frame depends on whether the glasswork is to be single or double. The spacing between adjacent studs is variable and must be determined specifically in each particular application. Preferably, aforesaid rigid studs will be made of aluminum, as well as the frames and the fillets.

Some embodiments of the invention are represented by mere way of example and without implying any limitations by the appended drawings of which:

Figure 1:
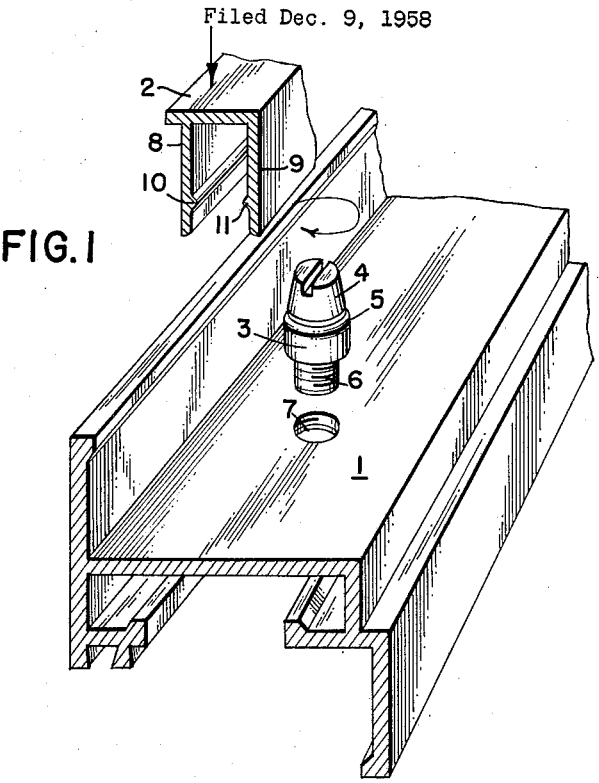
FIGURE 1 is a perspective view of the constituent elements of a device for fastening glass-pane fillets to metal frames.
Figure 2:
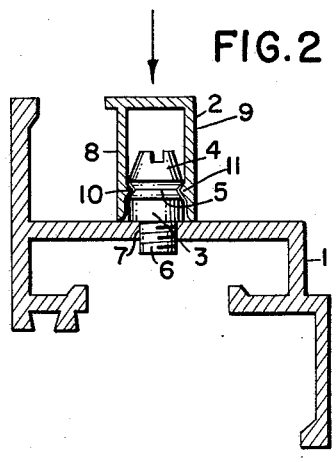
FIGURE 2 is a cross-section of the device shown in FIGURE 1, after assembly.

In FIGURES 1 and 2 are represented respectively the part of a frame 1 and a fillet 2. The characteristic stud, subject of the invention, has in this particular instance a cylindrical body 3, a head shaped as a frustum of a cone 4 and, between these parts a circular groove 5. The body 3 extends downward into a threaded shank 6 of smaller diameter. In the section 1 which is a constituent part of a frame, holes 7 are drilled and tapped at convenient intervals and in adequate numbers.

By merely screwing the studs 3—4—5 into the frame, all circular ribs 5 will be automatically aligned and located in the same plane, after which they need only be capped by the fillet 2. In the example which has been represented, these fillets have on each inner side-face 8—9 a continuous rib 10—11 respectively. On account of the elasticity of the side walls of the fillet, aforesaid ribs 10—11 can reach and snap into the circular groove 5 of the studs.

Figure 3:
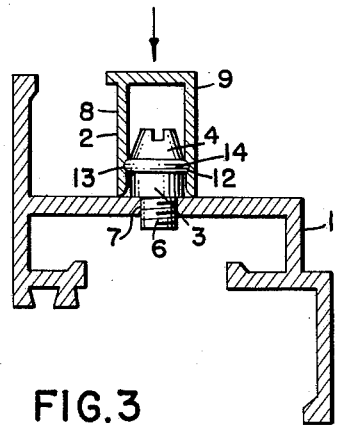
FIGURE 3 is a cross-section similar to that of FIGURE 2, but of somewhat different design.

In the example represented by FIGURE 3, the studs have a cylindrical body 3, a head shaped as a frustum of a cone 4 and, between these two constituent pairs, a circular rib or bead 12. In this particular embodiment, the inner faces 8—9 of the side walls of the fillet are provided with a groove 13—14 respectively, the elastic snapping-in occurring in the same way as in the preceding example illustrated by FIGURES 1 and 2.

It is evident that the studs can have any other possible shape in correlation with the fillets and the grasping means of the latter. The head may either be prismatic, semi-spherical, bevelled or otherwise; it may be fitted with a diametral slit in the upper face; it could also be striated, knurled or treated in any similar manner. The grasping means can either be continuous or interrupted; the body might also be prismatic or of any other shape; finally, the holding shank might either be conical, slit, prepared for riveting or assume any shape which is in accordance with its own means of fixing into the frame.

The invention concerns as well the whole of the device as any of its constituent parts and more particularly the studs and the fillets answering the end in view.

The same rigid studs may be used in conjunction with any other fixing parts such as mouldings or expansion-joint covers for instance. The assembling of parts of frames, walls, panels, etc. could also easily be made in this same way. In this connection, all that is required, is that one of the parts carries the rigid studs whereas the other part is fitted with the means correlated thereto. The present invention covers all such embodiments as well as their constituent parts.

What I claim is:

1. A device for fastening glass pane fillets and the like to frames and supports, said device comprising, in combination with a frame and a fillet having spaced walls, said walls being capable of transverse elastic deformation and having lower edges adapted to engage a surface of said frame; a plurality of spaced alined rigid studs carried by said frame and extending above said frame surface, the width of said studs being substantially equal to the distance between said spaced walls, the outer surfaces of said studs and the inner surfaces of said walls having means which interengage each other when said fillet is placed upon said frame and over said studs to provide a snug fit, said means upon the inner surfaces of said walls being spaced from said lower edges of the walls and said frame surface.

2. A device for fastening glass pane fillets and the like to frames and supports, said device comprising, in combination with a frame and a fillet having spaced walls, said walls being capable of transverse elastic deformation and having lower edges adapted to engage a surface of said frame; a plurality of spaced alined rigid studs carried by said frame, each of said studs comprising a shank screwed into said frame and a head integral with said shank and comprising a lower cylindrical portion having a diameter substantially equal to the distance between said spaced walls and an upper frusto-conical portion and a circular groove formed between said portions; said fillet having ribs upon the inner surfaces of the walls, said ribs being spaced from said lower edges of the walls and engaging the grooves of said studs to provide a snug fit when said fillet is placed upon said frame and over said studs, whereby the interengaging ribs and grooves are spaced from said frame surface.

3. A device for fastening glass pane fillets and the like to frames and supports, said device comprising, in combination with a frame and a fillet having spaced walls, said walls being capable of transverse elastic deformation and having lower edges adapted to engage a surface of said frame; a plurality of spaced alined rigid studs carried by said frame, each of said studs comprising a shank screwed into said frame and a head integral with said shank and comprising a lower cylindrical portion having a diameter substantially equal to the distance between said spaced walls, an upper frusto-conical portion and a circular rib between said portions; said fillet having parallel grooves formed upon the inner surfaces of the walls, said grooves being spaced from said lower edges of the walls and engaging the ribs of said studs to provide a snug fit when said fillet is placed upon said frame and over said studs, whereby the interengaging ribs and grooves are spaced from said frame surface.

References Cited in the file of this patent

UNITED STATES PATENTS

| | | |
|---|---|---|
| 2,112,178 | Selph | Mar. 22, 1938 |
| 2,252,925 | Hall | Aug. 19, 1941 |

FOREIGN PATENTS

| | | |
|---|---|---|
| 765,935 | France | June 18, 1934 |
| 325,076 | Italy | Feb. 27, 1935 |